Figure 5:
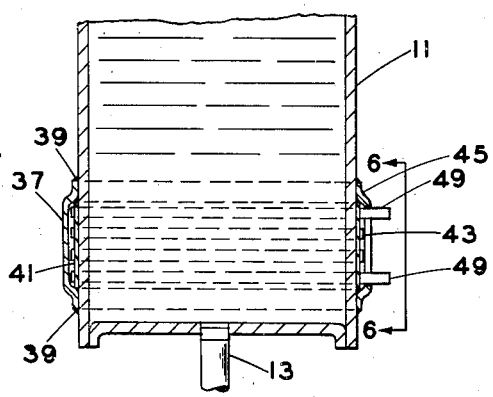

Aug. 9, 1949.  C. M. OSTERHELD  2,478,499
ELECTRIC WATER HEATER
Filed May 29, 1946  2 Sheets-Sheet 1
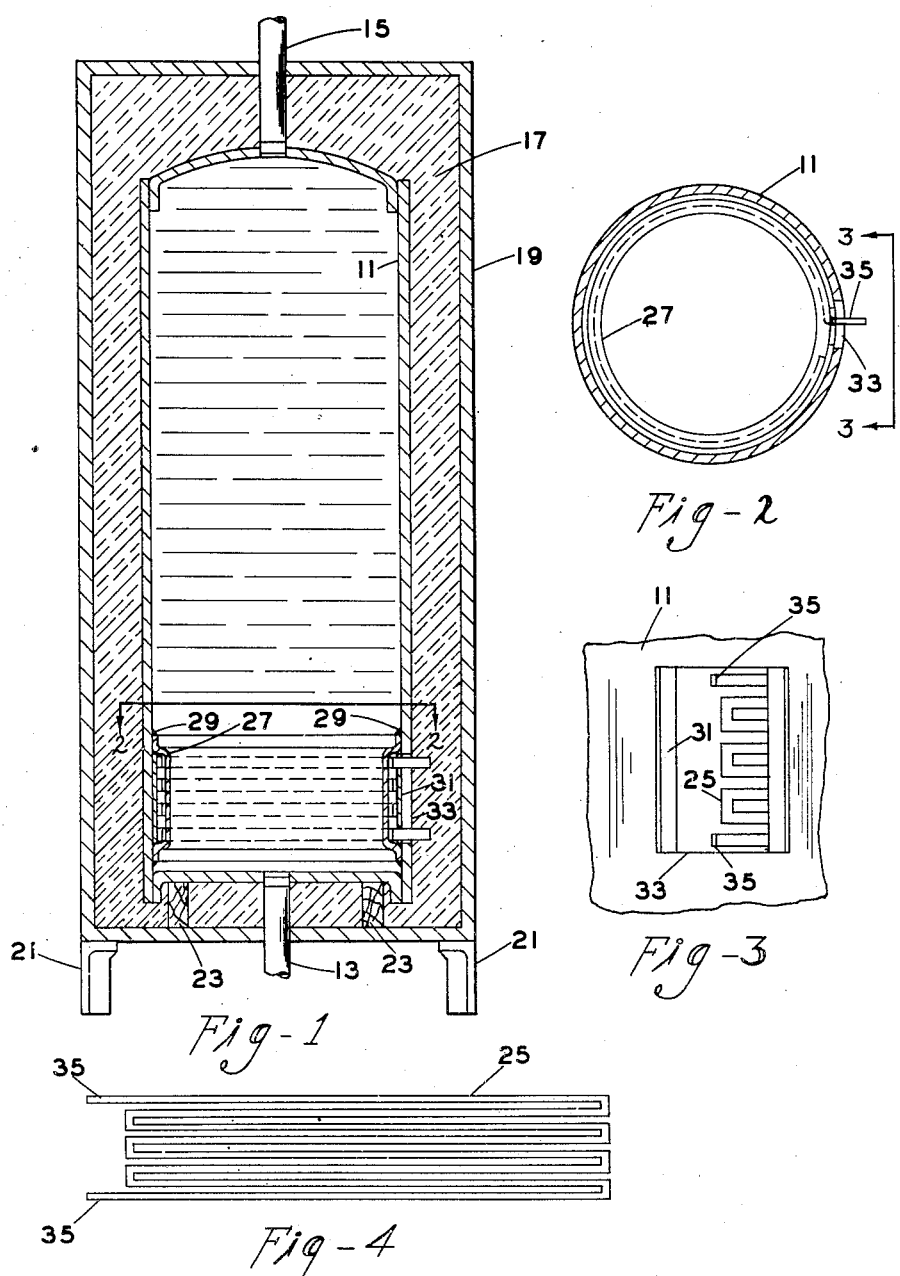
INVENTOR.
CLARK M. OSTERHELD
BY Aug. 9, 1949.    C. M. OSTERHELD    2,478,499
ELECTRIC WATER HEATER Filed May 29, 1946    2 Sheets-Sheet 2

INVENTOR.
CLARK M. OSTERHELD
BY
H M Biebel
ATTY

Patented Aug. 9, 1949

2,478,499

UNITED STATES PATENT OFFICE 2,478,499

ELECTRIC WATER HEATER

Clark M. Osterheld, Stoughton, Wis., assignor to McGraw Electric Company, Elgin, Ill., a corporation of Delaware Application May 29, 1946, Serial No. 673,208

5 Claims. (Cl. 219—39)

My invention relates to electric water heaters and particularly to a novel form of resistor for such heaters and to its mounting on a domestic hot water tank.

An object of my invention is to provide a relatively simple and highly efficient electric heater for domestic hot water tanks.

Another object of my invention is to provide an electric heater including, highly efficient means for conducting the heat generated in the resistor to the tank.

Another object of my invention is to provide a metallic resistor for an electric heater and a hot water tank that shall be applicable to either the outside or to the inside surface of a tank.

Another object of my invention is to provide a metallic resistor for the heater and a water tank, that shall have thereon a relatively thin integral, inorganic, heat-conducting, high-temperature-resisting, and electric-insulating coating.

Other objects of my invention will either be apparent from a description of several different forms of device, each embodying my invention, or will be set forth in detail hereafter and pointed out particularly in the appended claims.

In the drawings.

Figure 6:
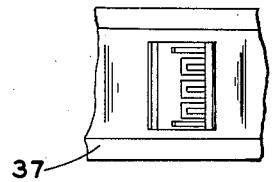
Figure 7:
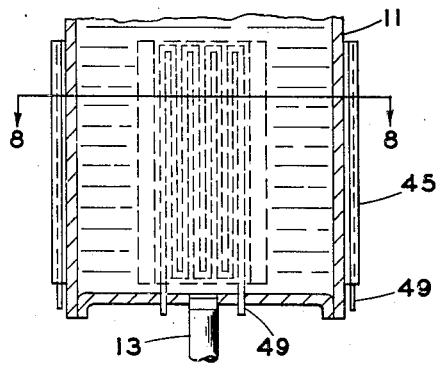
Figure 8:
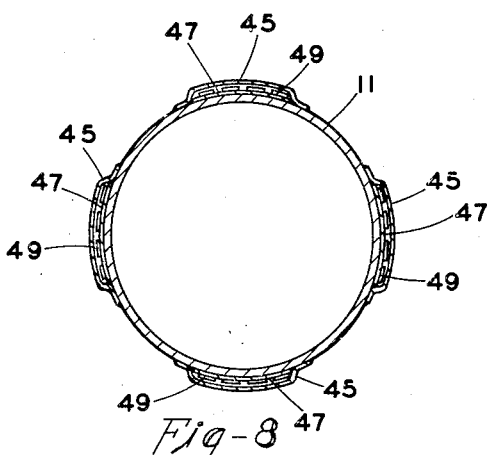
Figure 9:
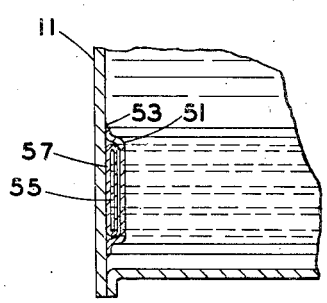

Figure 1 is a view, in vertical section, through a domestic hot water tank having operatively associated therewith an electric heater embodying my invention, Fig. 2 is a horizontal, sectional view therethrough taken on the line 2—2 of Fig. 1, Fig. 3 is a view in side elevation on an enlarged scale, taken on the line 3—3 of Fig. 2, Fig. 4 is a top plan view of a metallic resistor comprising a part of my invention, Fig. 5 is a fragmentary view similar to Fig. 1 showing the mounting of my improved electric heater on the outside of the tank, Fig. 6 is a view in side elevation thereof taken on the line 6—6 of Fig. 5, Fig. 7 is a still further modification of an electric heater embodying my invention, Fig. 8 is a view in section therethrough taken on the line 8—8 of Fig. 7, and, Fig. 9 is a fragmentary view showing a still further modification of my device.

Referring first of all to Fig. 1 of the drawings I have there illustrated a domestic hot water tank 11 which is provided with a lower cold water inlet pipe 13 and an upper hot water outlet pipe 15. It is surrounded by a mass 17 of heat-insulating material, which heat-insulating material is held in proper operative position by an outside casing 19, which casing is supported by two feet 21 and which supports the tank 11 as by blocks 23.

I provide an electric heater comprising a flat metallic resistor member strip 25 which, as is shown in Fig. 4 of the drawings, comprises a plurality of straight convolutions, the two adjacent end portions of which are connected to each other, the width end thickness of each of the substantially straight convolutions 25 being such that the resistance of the resistor member 25 will permit of a current traversing the resistor member to give the desired wattage. I may mention that the thickness of the metallic resistor member 25 may be on the order of .01 inch to .02 inch, and while I may make the metallic resistor member 25 of aluminum, I am not limited thereto but may use metallic resistor material now utilized in the art.

I provide a metallic member 27 which may be of thin sheet metal such as aluminum or steel and I weld the edges of the member 27, which is of flattened, shallow channel shape in lateral section, against the inner wall of tank 11 as by continuous welding seams 29.

I provide further a relatively thin sheet 31 which is preferably made of aluminum and has a thickness on the order of .01 inch or .015 inch and has a width sufficient to cover the surface of the tank and fit closely within the member 27 of channel shape.

I provide on the entire outer surface of the flat metallic resistor member 25, on the inner surface of the member 27, of channel shape, as well as on the entire outer surface of member 31 an integral, inorganic, heart-conducting, high-temperature-resisting, and electric-insulating coating made in accordance with U. S. Patent No. 1,526,127. The metallic resistor member 25 is first shaped to substantially circular form and having a diameter which is somewhat less than the diameter of the inner surface of the tank 11 so that when it is positioned inwardly through an opening 33 provided in the tank, the tendency of the resistor member 25 will be to closely engage the inner surface of the spacing strip 31. The resistor member unit 25 may be provided with two extensions 35 so that electric connections may be made to the resistor in a well-known manner.

Referring now to Figs. 5 and 6 I have there shown a member 37 of flattened, shallow channel shape in lateral section, the side portions of member 37 being welded into close engagement with the outside surface of tank 11 by seams 39. I provide a strip 41 which is preferably but not necessarily made of relatively thin aluminum having a thickness on the order of .01 to .015" and locate the same between a resistor 43 and the outside surface of tank 11.

Referring to the resistor member 43 in Figs. 5 and 6 which is of the same character as resistor 25, the entire outer surface of the resistor is covered with a relatively thin integral, inorganic, heat-conducting, high - temperature - resisting, and electric-insulating coating substantially as hereinbefore set forth in connection with resistor 25. The inner surface of the member 37 of channel shape as well as an entire outer surface of strip 41 is also covered with substantially the same kind of coating. One method of making such a coating on the surface of a member of aluminum is set forth in Patent No. 1,526,127, but other well-known methods usable in case of change from aluminum to steel may also be used. The thickness of said coating may be on the order of .001".

Referring now to Figs. 7 and 8 I have there shown an electric tank heater extending substantially vertically of the tank. A metallic member 45, of relatively flat, shallow channel shape has its vertical edges welded against the outer surface of a tank. While I have shown four such members, I do not desire to be limited thereto. A metal plate 47, preferably of aluminum and having a thickness on the order of .015" is positioned between a resistor 49 and the outer surface of the tank. The inner surface of member 45, the entire outer surface of spacing plate 47 and of resistor member 49 has thereon an integral, inorganic, heat-conducting, high-temperature-resisting and electric-insulating coating, the thickness of which is on the order of .001".

Referring now to Fig. 9 of the drawings I have there shown a hot water tank 11 having welded against its inner surface a member 51 of flattened, shallow channel shape as by welding seams 53. A resistor 55 of substantially the same kind as resistor 25 in Fig. 4 is positioned within a member 57 which is of flattened tubular shape and the inner surface of which closely engages the outer surface of resistor 55. The resistor 55 as well as its enclosing tubular member 57 may be made of aluminum and the thickness thereof is on the order of .01" to .015".

The device embodying my invention shows structures utilizing a relatively thin metallic resistor member having over its entire outer surface a thin integral, inorganic, heat-conducting, high-temperature-resisting, and electric-insulating coating, the thickness of which is on the order of .001". I have found that the temperature differential between the temperature of the resistor member and the surface of the tank or of the member of channel shape through which the heat reaches the water is less than on the order of 400° F. That is, the temperature of the resistor member is higher than the temperature of the heat flow path adjacent the water by an amount on the order of 400° F.

The members 27, 37, 45 and 51 may be made of copper or of aluminum, the latter material having light-weight as well as high-heat conductivity, the same as copper. The welding of these members to the tank need not be water-tight in case they are welded against the outside surface of the tank but are preferably made water-tight. The path of the flow of heat from the resistor to the water is directly inwardly from the resistor and through the side portions of the sheaths of channel shape. While these side portions have been shown relatively narrow, I may widen them to reduce the amount of heat carried by a unit area. The depth of these sheaths of channel shape is just sufficient to receive the resistor and the spacing strip or the flattened tubular member. In case the heating unit is located inside the tank the sheath must be welded to the tank in a water-tight manner.

The thickness and the width of the individual convolutions of the resistor member may be made such as to give the desired ohmic resistance. However, instead of forming the resistor out of a sheet, I may use a conductor strip forming it to comprise substantially straight end connected convolutions, the general appearance of which will be substantially the same as shown in Fig. 4.

Various modifications may be made in the device embodying my invention without departing from the spirit and scope thereof and all such modifications clearly coming within the scope of the appended claims shall be considered as covered thereby.

I claim as my invention:

1. A hot water tank of metal having a imperforate metallic member of flattened channel shaped in lateral section secured thereto in a water-tight manner against its inner surface and a flat metallic resistor member in said member of channel shape, said resistor member having on its entire outer surface an integral, inorganic, heat-conducting, high-temperature-resisting and electric-insulating coating.

2. An iron hot water tank having a metallic member of flat channel shape in lateral section secured thereto in a water-tight manner against its inner surface, a flat metallic resistor member in said member of channel shape and a spacing strip of aluminum between said resistor and said tank, the entire outer surface of said spacing strip and of said resistor member and the inner surface of the intermediate portion of said member of channel shape having thereon an integral, inorganic, heat-conducting, high-temperature-resisting and electric-insulating coating.

3. A hot water tank of iron having a metallic member of shallow channel shape in lateral section secured thereto in a water-tight manner against its inner surface to provide a shallow space between said metallic member and the wall of the tank, a flat, thin metallic resistor within said member of channel shape and a spacing strip of aluminum between the tank and said resistor, said resistor and spacing strip each having on its entire outer surface an integral, inorganic, heat-conducting, high-temperature-resisting and electric-insulating coating.

4. The combination of the immediately preceding claim wherein said resistor contains aluminum and wherein the coating of said resistor and spacing strip includes oxidation products of aluminum.

5. A hot water tank of iron having a metallic member of shallow channel shape in lateral section secured thereto in a water-tight manner against its inner surface to provide a shallow space between said metallic member and the wall of said tank, a flat thin metallic resistor within said space constituting a heater for said tank, and means for electrically insulating said resistor from said metallic member and said tank.

CLARK M. OSTERHELD.

REFERENCES CITED

The following references are of record in the file of this patent:

UNITED STATES PATENTS

| Number | Name | Date |
| --- | --- | --- |
| 2,360,367 | Osterheld | Oct 10, 1944 |
| 2,367,369 | Osterheld | Jan. 16, 1945 |
| 2,423,598 | Hynes | July 8, 1947 |

Certificate of Correction

Patent No. 2,478,499

August 9, 1949

CLARK M. OSTERHELD

It is hereby certified that error appears in the printed specification of the above numbered patent requiring correction as follows:

Column 2, line 2, for the word "end" read *and*;

and that the said Letters Patent should be read with this correction therein that the same may conform to the record of the case in the Patent Office.

Signed and sealed this 28th day of March, A. D. 1950.

[SEAL]

THOMAS F. MURPHY,
*Assistant Commissioner of Patents.*